No. 773,883. PATENTED NOV. 1, 1904.
C. H. MONTGOMERIE Y AGRAMONTE.
HYDROCARBON BURNER.
APPLICATION FILED APR. 8, 1903.
NO MODEL. 2 SHEETS—SHEET 1.
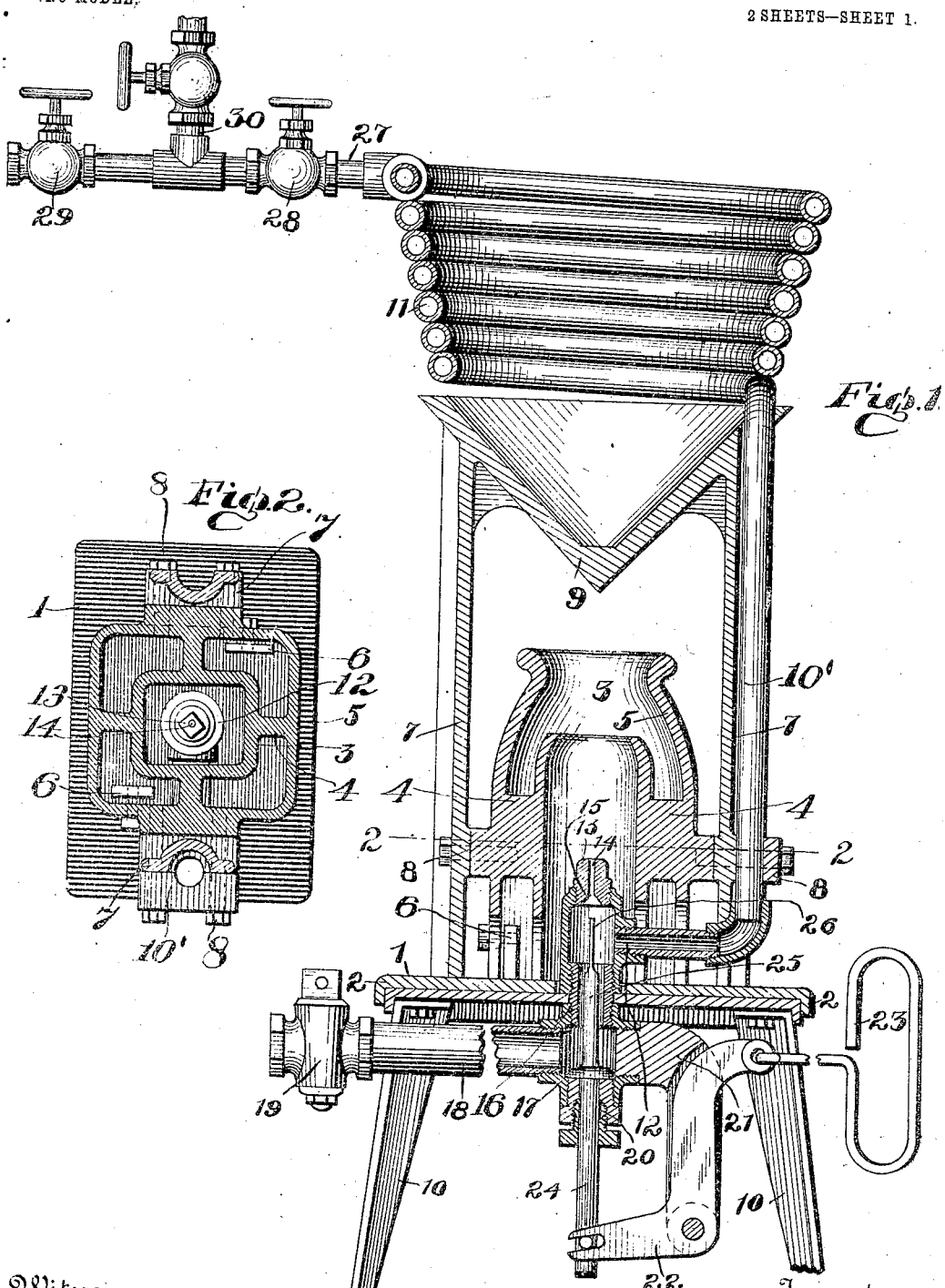

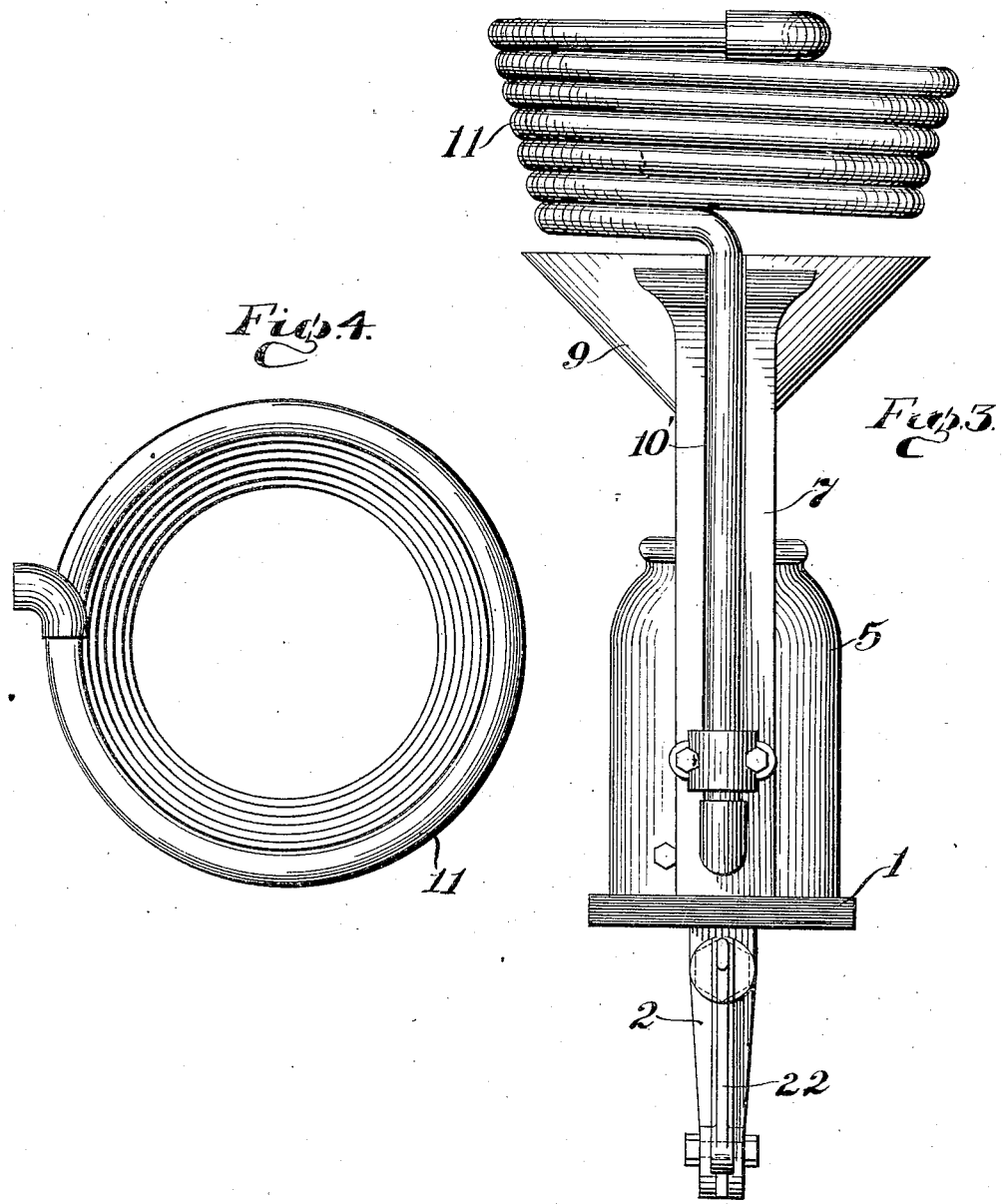

No. 773,883.

Patented November 1, 1904.

UNITED STATES PATENT OFFICE.

CLARENCE HORACE MONTGOMERIE Y AGRAMONTE, OF MEXICO, MEXICO.

HYDROCARBON-BURNER.

SPECIFICATION forming part of Letters Patent No. 773,883, dated November 1, 1904.

Application filed April 8, 1903. Serial No. 151,569. (No model.)

*To all whom it may concern:*

Be it known that I, CLARENCE HORACE MONTGOMERIE Y AGRAMONTE, a citizen of the United States, residing at the city of Mexico, Republic of Mexico, have invented certain new and useful Improvements in Hydrocarbon-Burners, of which the following is a specification, reference being had to the accompanying drawings.

This invention has relation to hydrocarbon-burners; and it consists in the novel arrangement and construction of its parts, as hereinafter shown and described.

The object of my invention is to provide a hydrocarbon-burner adapted especially to burn crude oil, the burner being so constructed as to withstand intense heat and consisting of as few parts as possible consistent with the services to be performed.

It consists, primarily, of an elevated coil of peculiar arrangement to which the fuel-oil is fed at the top and passes down in the opposite direction from the course taken by the flame from the burner and is thus gasified. The gas is conducted down to the burner, which is located below the said coil, and below the said burner is located a drip adapted to receive hot grease and objectionable residuum from the oil, said drip having a suitable valve whereby the drip may be drained and the apparatus freed of the objectionable matter above referred to.

The burner is provided with a nipple which may be freed of the small particles of foreign substance which are frequently found in crude oil and which get past the strainer (when such are used) in spite of every precaution, a plunger being located below said nipple and having a needle adapted to pass through the opening in the nipple and remove foreign particles. A suitable means is provided for "blowing out" the burner and forcing all residuum in the coil, pipes, burner, and drip out of the apparatus. A deflecting inverted cone is inserted between the burner and the said coil, and the burner is surrounded by two casings, one within the other, the said casings being integrally joined together and mounted on a base-plate. The supports for the inverted cone rest at their lower ends upon the said base-plate and are bolted to the said casings. A suitable lever mechanism is provided for operating the plunger and needle for cleaning the burner-nipple.

In the accompanying drawings, Figure 1 is a transverse sectional view of the burner. Fig. 2 is a horizontal sectional view of the burner cut on the line 2 2 of Fig. 1. Fig. 3 is a side elevation of the burner, and Fig. 4 is a top plan view of the coil.

The burner consists of the base-plate 1, which has its edges turned down, as at 2. The inner burner-casings 3 are connected by the webs 4 with the outer burner-casings 5. Thus the said inner and outer casings are made integral, and the casings are bolted to the lugs 6, located on the upper face of the base-plate 1. The lower ends of the supports 7 7 rest on the upper face of the base-plate 1, said supports at the point 8 being bolted to the integral casings 3 and 5. The inverted-cone-shaped flame-deflector 9 is integrally attached to the upper ends of the supports 7 7, the apex of the cone of said deflector being located directly over the center of the openings in the upper ends of the casings 3 and 5. The base-plate 1 may be supported on the grate-bars of a furnace, (not shown in the drawings,) or they may be supported on suitable legs 10 10. Above the inverted-cone-shaped flame-deflector 9 is located a coil 11, which is formed on the frustum of a cone, the lower end of the said coil being of less diameter than the upper end of the flame-deflector 9 and the upper end of the said coil being of a little greater diameter, as shown in Fig. 1. The lower end of the pipe forming the coil 11 is carried down along one of the supports 7 and in the channel 10', (see Fig. 2,) formed therein; but the said pipe does not come in contact with the said support 7 at any point above the upper end of the outer casing 5. The lower end of the said pipe is led in laterally through registering openings in the lower portion of the casings 3 and 5 and is connected to the side of the burner proper, 12. The upper end of the burner is provided with a nipple 13, said nipple having a cylindrical opening 14 passing perpendicularly therethrough, with a funnel-shaped entrance 15 at its lower end. The pipe 16 enters at its upper end the bottom of the burner 12 and at its lower end the cross-union 17, the pipe 18 being attached to one of the horizontal outlets of said union 17 and being provided at its end with the valve 19. In the lower outlet of the said union 17 a stuffing-box 20 is located, and in the other horizontal outlet the arm 21 is secured. To the lower end of the said arm 21 the bell-crank lever 22 is fulcrumed. The upper end of the said lever is provided with a suitable handle 23, and the lower end of the said lever is pivotally connected to the lower end of the stem 24. The upper end of the stem 24 is attached to the plunger 25, which extends through the pipe 16. The upper end of the said plunger 25 is provided with a needle 26, which is adapted to fit within the cylindrical opening 14 of the nipple 13. The fuel-supply pipe 27 is connected to the upper end of the coil 11, the said pipe being provided with a needle-valve 28, an oil-valve 29, and being connected with a steam-pipe 30.

The operation of the device is as follows: The valves 28, 29, and 30 are closed, and in the interior space in the deflector 9 and coil 11 is placed a small quantity of any combustible material, which is ignited and allowed to burn for a few minutes until the coil is heated. Then the oil-supply valve 29 is opened, and the needle-valve 28 is opened to a sufficient extent to permit the desired flow of oil to the burner when the burner may be lighted at the upper end of the casing 5. The oil passes by the needle-valve 28, through the pipe 27, into the upper end of the coil 11, then down through the said coil and the pipe at its lower end into the burner 12, then up through the opening 14 in the nipple 13, where it is ignited. The heat from the flame passes up through the openings in the upper ends of the casings 3 and 5, is deflected by the lower side of the deflector 9, and carried up along the sides of the coil 11. Thus the oil is gasified in the said coil, and at the same time the coil is protected from the intense heat by the deflector 9, which is preferably made of cast metal. The pipe leading from the said coil down to the burner is also protected by the adjacent support 7 from the intense heat of the flame and also by the air-space between the said pipe and the said support. When the coil 11 and its connections have accumulated a quantity of grease or other objectionable matter which interferes with the operation of the burner, the oil-valve 29 can be closed and the valve 19 opened and steam under pressure permitted to pass through pipe 30, through pipe 27, through the coil 11 and its connections to the burner 12, through pipe 16 and pipe 18, and out through the said valve 19, thus freeing the said parts of the said objectionable matter. While the burner is in operation the ordinary quantity of objectionable matter which finds its way into the burner 12 passes down through the pipe 16 and is accumulated in the union 17 and the pipe 18, from which parts it can be removed by repeating the operation above described. Should foreign matter accumulate in the opening 14 of the nipple 13, the operator can grasp the handle 23 and swing the bell-crank lever 22 on its fulcrum, and thereby cause the plunger-stem 24 to reciprocate perpendicularly. The plunger 25 and the needle 26 following this movement, the needle is passed in and out of the opening 14 in the nipple 13, and consequently any foreign matter that has accumulated in the said opening 14 is pushed out at the top. The lower funnel-shaped portion 15 of the opening 14 serves as a guide for the end of the needle 26.

In view of the fact that some liquid fuels require a burner with a single burner-casing, such as 5, while other fuels require the use of double burner-casings 3 and 5, any number of such casings may be used as the nature of the fuel requires without departing from the spirit of my invention.

In order to insure a regular flow of the liquid fuel through the pipes and burner and prelude the possibility of back pressure from the gas generated in the gasifier and also preventing intermission or pulsation in the flame or gas-supply to the burner, an ordinary oil-supply tank (not shown in the drawings) may be provided and placed at any desired elevation or even placed below the level of the burner, and an air-compressor may be provided for pumping into said tank until a pressure, say, of twenty-five or more pounds is attained therein.

Having described my invention, what I claim as new, and desire to secure by Letters Patent, is—

1. A hydrocarbon-burner consisting of a gasifier having a supply-pipe and a pipe leading therefrom, a burner connected to the last said pipe being suitably mounted on a base-plate, inner and outer casings surrounding said burner and being integrally joined together, a flame-deflector interposed between the gasifier and said burner, supports attached directly to said flame-deflector and resting at their opposite ends upon said base-plate and being secured at intermediate points to the said burner-casings and adapted to maintain the deflector in proper position with relation to the burner.

2. A hydrocarbon-burner comprising a gasifier consisting of an elevated coil formed in cross-section on the frustum of a cone having its end of greater diameter uppermost, a supply-pipe connected to the upper end of said coil, a pipe leading from the lower end of said coil, a burner connected to the last said pipe and being located beyond and under said coil and a flame-deflector interposed between the said coil and the burner, the diameter of the upper end of said deflector being greater than the diameter of the lower end of the frustum and less than the diameter of the upper end of the frustum described by the coil.

In testimony whereof I affix my signature in the presence of two witnesses.

CLARENCE HORACE MONTGOMERIE Y AGRAMONTE.

Witnesses:
JULIO MEYER,
MAURICIO SCHICK.